(12) United States Patent
Van Overveld et al.

(10) Patent No.: US 6,788,808 B1
(45) Date of Patent: Sep. 7, 2004

(54) METHOD AND DEVICE FOR OPTICALLY DETERMINING DEPTH

(75) Inventors: Cornelis W. A. M. Van Overveld, Eindhoven (NL); Antonius A. C. M. Kalker, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/486,671
(22) PCT Filed: Jul. 8, 1999
(86) PCT No.: PCT/EP99/04935
§ 371 (c)(1), (2), (4) Date: Feb. 29, 2000
(87) PCT Pub. No.: WO00/03356
PCT Pub. Date: Jan. 20, 2000

(30) Foreign Application Priority Data

Jul. 10, 1998 (EP) .......................... 98202326

(51) Int. Cl.$^7$ .............................. G06T 15/00
(52) U.S. Cl. .................................... 382/154
(58) Field of Search ................ 382/103, 106, 382/154, 285, 289, 291; 345/419, 427

(56) References Cited

PUBLICATIONS

Boaz J. Super et al., Patch–Based Stereo in a General Binocular Viewing Geometry, IEE Transactions on Pattern and Machine Intelligence, vol. 19, No. 3, Mar., 1997, pp. 247–252.*

* cited by examiner

Primary Examiner—Brian Werner

(57) ABSTRACT

The depth and orientation of a surface patch relative to a camera are determined. A first and second image of the surface patch are obtained from different viewpoints. Various predicted combinations of depth and orientation values are associated with the surface patch. Different available combinations may have different orientations. Each predicted combination predicts a correspondence between points in the first and second image, corresponding points viewing identical locations on the surface patch. One searches for a best combination of depth and orientation so that among the available combinations the best combination results in a minimum aggregate of differences between pixel values of the first and second image at corresponding points.

10 Claims, 3 Drawing Sheets

METHOD AND DEVICE FOR OPTICALLY DETERMINING DEPTH

BACKGROUND OF THE INVENTION

1. Field of the Invention

The invention relates to a method for optically determining the viewing depth of a surface patch in a scene from images obtained from different viewpoints.

2. Description of the Related Art

For a number of applications it is desirable to determine the depth of surface patches that are visible in an image. Examples of such applications include systems that make it possible to compute images of the scene viewed from interactively controllable viewpoints, image compression, inspection etc. Herein, depth of a point on a surface patch refers to the distance between the viewpoint and the plane through the point and perpendicular to the optical axis of camera.

When the viewpoint of the camera is moved from a first to a second viewpoint, a depth of a surface patch can be determined from the amount of translation of the position of the image region where the surface patch is visible. If the image is obtained by point projection, the translation is proportional to the amount of displacement of the camera and inversely proportional to the depth of the surface patch.

It has been known, in order to measure the translation, to match the pixel values in a first image region in a first image obtained from the first viewpoint to the pixel values of a translated image region in a second image obtained from the second viewpoint. Matching involves determining an aggregate of the differences between the pixel values of the first image region and the pixel values in a another region. This is repeated for a number of such other regions at different positions in the second image. One of those positions is selected for which the measure of difference indicates that the aggregate of differences is minimal.

When the surface patch is small or lies in a plane perpendicular to the optical axis of the camera, the measure of difference between the pixel values of the first image region and the pixel values of the matching translated image region will indicate near perfect match. However, larger surface patches that do not lie in a plane perpendicular to the optical axis will not result in a perfect match and will tend to get segmented into smaller patches with discontinuities between the depths estimated for the smaller patches.

Amongst others, it is an object of the invention to improve the reliability and accuracy of estimates of the depth of larger surface patches that do not lie in a plane perpendicular to the optical axis of the camera.

SUMMARY OF THE INVENTION

According to the invention one searches for a combination of both depth and orientation values for the surface patch (The depth of a surface patch is for example the depth of a specified point on the surface patch). Each such combination gives rise to a particular correspondence between image points in the first and the second image. This correspondence is tested by computing an aggregate of the differences of the pixel values at corresponding points. For the best combination of depth and orientation a near perfect match will be possible also for larger surfaces that are not in a plane perpendicular to the optical axis of the camera. Hence there is no reason for segmenting these surface patches into smaller patches.

Preferably, one selects surface patches by taking predetermined regions in a first image, such as rectangular blocks of pixels. Thus no prior assumption need to be made about surface patches. For each region one selects a number of possible combinations of depth and orientation for the surface patch that is visible in that regions. Then, one determines where the pixels of that region should move if a combination of depth and orientation were correct. One determines the aggregate of the differences between the pixel content of these pixels in the first image and the pixels where they have moved to in the second image. The combination of depth and orientation which minimizes this aggregate is selected as best approximation for the depth and orientation of the surface patch visible in the region.

This is preferably applied to a grid of blocks which covers the image.

Preferably, not all combinations of depth and orientation are tried, but only combinations that are expected to be the most probable, for example combinations that have been found to be the best approximations in regions adjacent to the region for which one is trying to find the best combination of depth and orientation. Other examples of such probable combinations include combinations that have been found the most probable combination of depth and orientation by an earlier comparison of the image in the region with a further image

BRIEF DESCRIPTION OF THE DRAWINGS

These and other advantageous aspects of the invention will be described in more detail using the following figures.

DETAILED DESCRIPTION OF THE INVENTION

Figure 1:
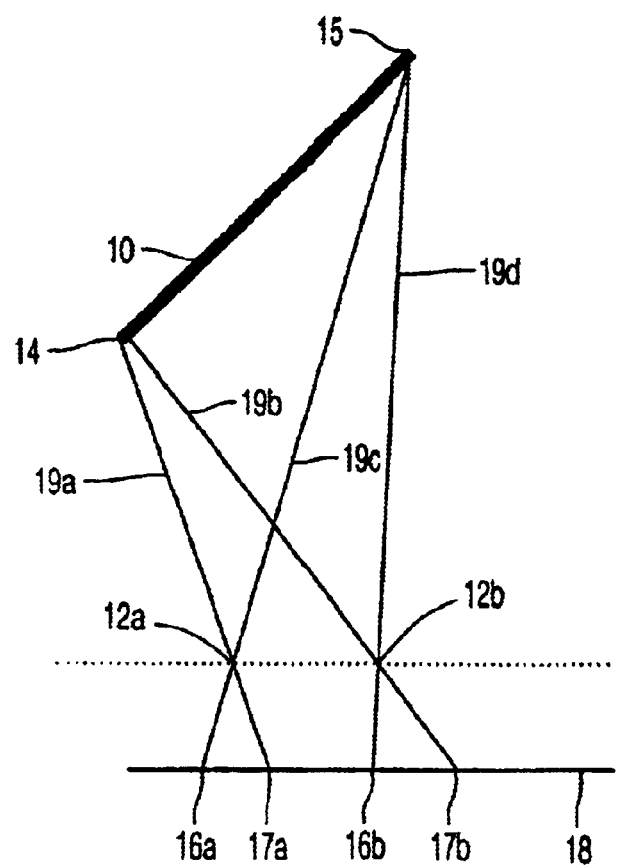
FIG. 1 shows the geometry of surface patch and two viewpoints

FIG. 1 shows the geometry of a surface patch 10 and two viewpoints 12a,b. When images of a scene containing the surface patch 10 are obtained using point projection from different viewpoints 12a,b, the position where points 14, 15 on the surface patch will be visible in the image are projections 16a,b, 17a,b of points 14, 15. The projections can be illustrated by drawing lines 19a–d from the points 14, 15 through the viewpoints 12a,b to an image plane 18. For setting out the basic principles, the viewpoints 12a,b have been selected in a plane parallel to the image plane 18, but the invention is not limited to such a selection of viewpoints 12a,b. The intersections between these lines 19a–d and the image plane 18 illustrate the positions where the points 14, 15 on the surface patch will be visible in images.

It will be noted that a change of viewpoint 12a,b results in a translation of the position 16a,b 17a,b where a point 14, 15 on the surface patch will be visible in the image plane 18. This translation is inversely proportional to the depth "z" between the viewpoint and the point and proportional to the amount of change in the position of the viewpoint. As a result, the translation will be different for points 14, 15 on the surface patch 10 that have different depths "z" from the viewpoints 12a, b.

Figure 2:
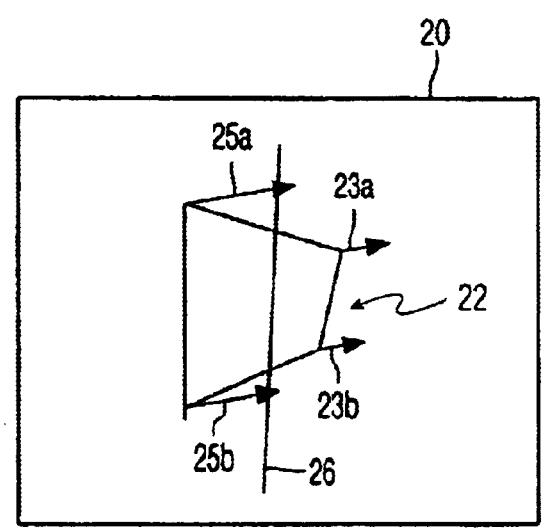
FIG. 2 shows an image of a surface patch

FIG. 2 shows an imaged 20 containing a region 22 where a surface patch is visible. In the image 20 translation vectors 23a,b, 25a,b are shown by which the positions where points on the surface patch that are visible in the image 20 will be translated in response to a movement of the viewpoint. It will be noted that the translation vectors 25a,b will be larger for points on the surface patch that are closer to the viewpoint than for points that are further from the viewpoint. Along a line 26 where the depth of all points is the same, the translations will be the same.

When one uses a coordinate system having an axis along the line 26 and an axis perpendicular to that line, the amplitude of translation "D" of the position where a point is visible will proportional to A+Bu, where u is a coordinate of the position where the point is visible along the axis perpendicular to the line 26. The direction of translation is opposite to the direction of movement of the viewpoint. The parameter "A" is proportional to the inverse of the depth "Z0" at u=0: A=c/Z0 and "B" is similarly proportional to that depth and the slope "s" of the surface patch perpendicular to the direction of viewing: B=c*s/Z0 (c is a proportionality constant proportional to the displacement of the viewpoint, the focus distance and the scale of the image).

Often, surface patches will be "textured" that is, they will give rise to position dependent gray values or color vector values (in general "image content") in a region where the surface patch is visible in an image of the scene. As regions move and deform due to movement of the viewpoint, the texture makes it possible to track this movement by matching the image content of the original region with its moving and deforming counterpart.

Figure 3:
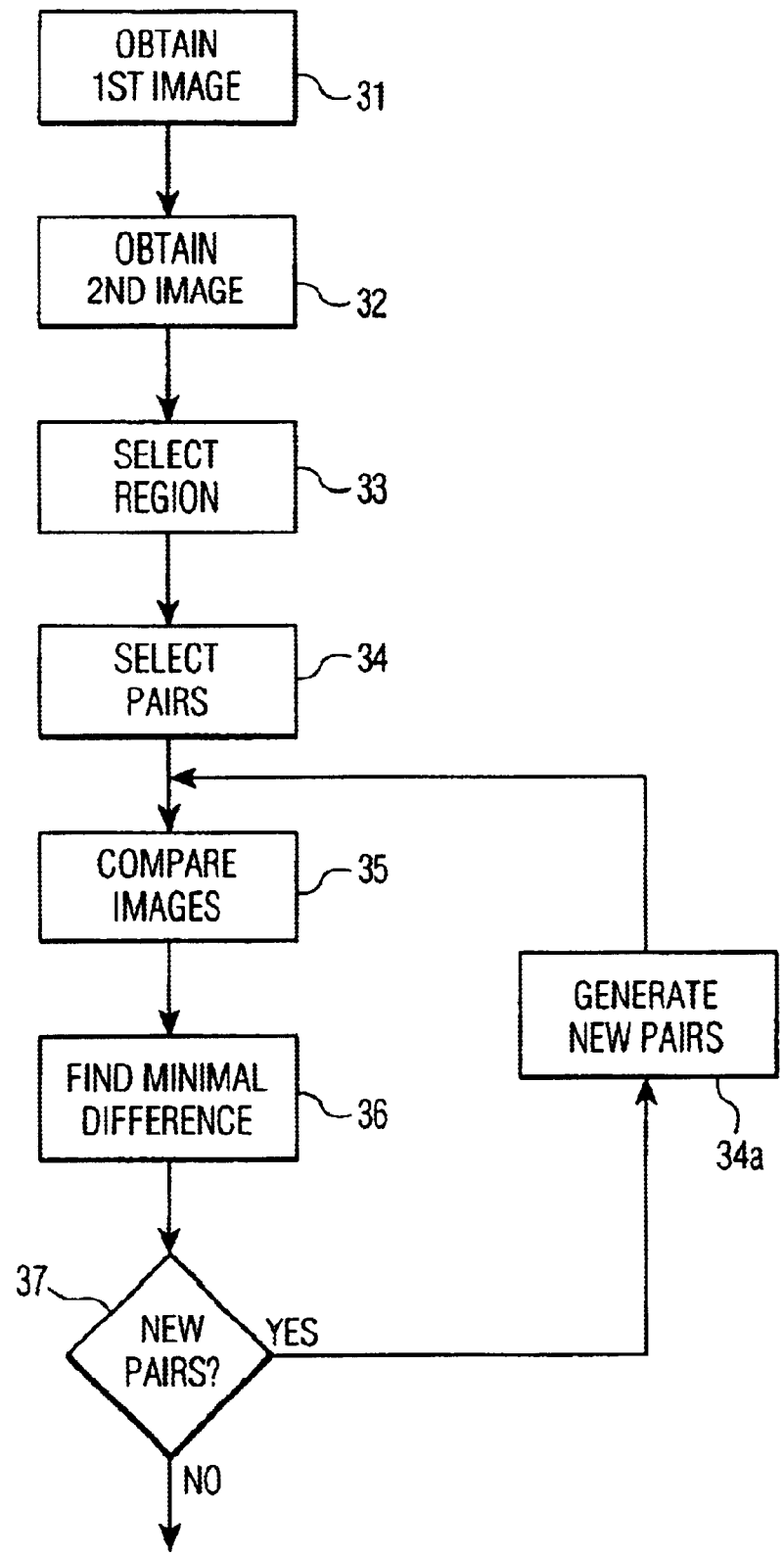
FIG. 3 shows a flow-chart of a method for estimating depth and orientation of a surface patch 9

FIG. 3 shows a flow-chart of a method for estimating the depth and orientation of a surface patch.

In a first and second step 31, 32 of the flow chart image the camera optics are positioned at a first and second viewpoint respectively, from which a first and second image is obtained respectively.

In a third step 33 of the flow chart a region in the first image is selected. In a fourth step 34 of the flow-chart a number of candidate depth-orientation pairs are selected. These pairs may each be used to determine an orientation of the line 26 and the parameters A, B.

The candidate pairs may be selected for example on the basis of depth-orientation pairs determined for neighboring regions or for the same region from a previous camera movement with respect to an earlier image. A method of selecting candidate depth values is known for example from European patent application No. 98200358.4 (W/O 99/40726) incorporated herein by way of reference as background material. In the same way that this known method selects different regions and uses their estimated depth values as candidate depth values, one may use the depth and orientation of such selected regions as candidate depth-orientation pairs.

A depth-orientation pair defines a correspondence between points in the first and second image. Corresponding points in the first and second image are points which would be the projection of the same location on a surface patch onto the first and second image respectively, if that surface patch had a depth and orientation equal to that of the depth orientation pair.

In a fifth step 35 of the flow-chart the pixel content from points in the first image is compared to the pixel content at corresponding points in the second image for each of a number of depth orientation pairs.

This may be realized for example by summing the absolute values of the difference between the image content (gray value or color vector) at a point in the first image and its corresponding point in the second image. In this case the measure of difference is $$SUM'_R |I1(R) - I2(F(R))|$$

where the sum runs over a number of x,y positions R in a region in the first image, I1(R) being the image content of the first image at the position R, and I2(R) being the image content of the second image at a translated position F(R). The translated position F(R) has xy components which are a function of the original position R and depth and orientation of the depth-orientation pair for which the measure of difference is computed.

Instead of the sum of the absolute values of the differences, one may sum any other measure of difference, such as the squares of the differences. Also, in order to obtain corresponding points, one need not sum over predetermined positions in any one of the image, but instead one might sum over reference points W which map to corresponding points R1=F1(W) and R2=F2(W) in the first and second image.

$$SUM'_W |I1(F1(W)) - I2(F2(W))|$$

The texture of the surface patch is for the reliability of the measure of difference. If the surface patch has no texture, the measures of difference computed for various depth-orientation pairs will all be very small.

In a sixth step 36 of the flow-chart it is determined which of the depth-orientation pairs lead to a minimal measure of difference. In a seventh step 37 it is determined whether this difference is sufficiently small. If not, the depth-orientation pair is used in step 34a to generate new candidate depth-orientation pairs on the basis of the depth-orientation pair with minimal difference measure and the flow-chart is repeated from the fifth step 35.

Finally, the depth orientation pair may be optionally further optimized by seeking an optimum near the best candidate, for example using an iterative minimum finding algorithm, which uses the gradients of the measure of difference with respect to depth and orientation.

If the measure of difference is sufficiently small, it is tested whether all desired regions from the first image have been handled. If not, the method is repeated for a different region in the first image.

As a result, depth and orientation estimates will be available for a number of regions in the image.

The translated position F(R) for a given depth-orientation pair can be computed as follows. First one computes the three dimensional position P corresponding to the image point R in the image taken from the first viewpoint. This point P is uniquely determined under the assumption that the point P is on a surface patch with the depth-orientation pair. Given P and the translation and rotation of the camera optics when moving from the first viewpoint to the second viewpoint, the projection F(R) of P from the second viewpoint is then computed.

For example, if the point P has coordinates $(P_x, P_y, P_z)$ relative to the camera optics from the first viewpoint, then the position R=(x,y) where this point is visible in the image from the first viewpoint are given by $$x = S * P_x / P_z$$

$$y = S * P_y / P_z$$

S is a given camera optics parameter. The given depth orientation pair prescribes that P must satisfy an equation A*P=C, where A*P is the scalar product of P with a vector A normal to the surface path with the given orientation and C is a constant dependent on A and the depth. In this way, the depth orientation pair is represented by A, C (where only two components of A need be independently variable).

Thus three equations are available from which $(P_x, P_y, P_z)$ can be solved as a function of R.

The projected position $F(R)=(F_x(R), F_y(R))$ of the point P from the second viewpoint is a function of the position of the viewpoint (which can be expressed as a vector D of three dimensional translation from the first viewpoint), the orientation of the camera optics (which can be expressed with a rotation matrix Q, which transforms a set of axes of the camera optics at its first position to those axes of the camera optics at the second viewpoint):

$$F_x(R)=S[Q(P+D)]_x/[Q(P+D)]_z$$

$$F_y(R)=S[Q(P+D)]_y/[Q(P+D)]_z$$

Given the movement of the camera optics in terms of Q, D, F(R) thus readily follows from P. In practice this computation can of course be collected in an algebraic expression for F(R) to be used for computing the measure of difference, so that P need not be computed explicitly each time. For example, in the simple case of translation of the camera optics parallel to the image plane 18 without rotation of the camera optics $$F(R)=R+T^*(1+R.N)/Z0$$

In this formula Z0 is the depth from the depth-orientation pair for the surface patch, T (corresponding to D) is a vector in the image plane in a direction opposite to the direction of translation of the viewpoint and the scalar product of R and the vector N represents the orientation of the surface patch from the depth-orientation pair: N is the perpendicular projection of the normal to the surface patch onto the image plane divided by the length of the component of that normal along the optical axis of the camera optics.

Corresponding points R1, R2 in the first and second image may also be obtained by computation of both R1 and R2 from Px,Py,Pz values obtained from a grid of Px, Py values with Pz values selected so as to satisfy the particular depth-orientation pair. In this case, one may sum over differences of pixelvalues I1(R1), I2(R2) obtained for points on this grid of Px, Py values, instead of summing over a grid of points from any one of the first and second image. The Px, Py values on the grid may be equally spaced in arbitrary directions, selected at random, or taken equally spaced along lines of equal depth and the spacing perpendicular to those lines varying inversely proportional to the depth, so as to obtain a homogeneous distribution in the images.

Figure 4:
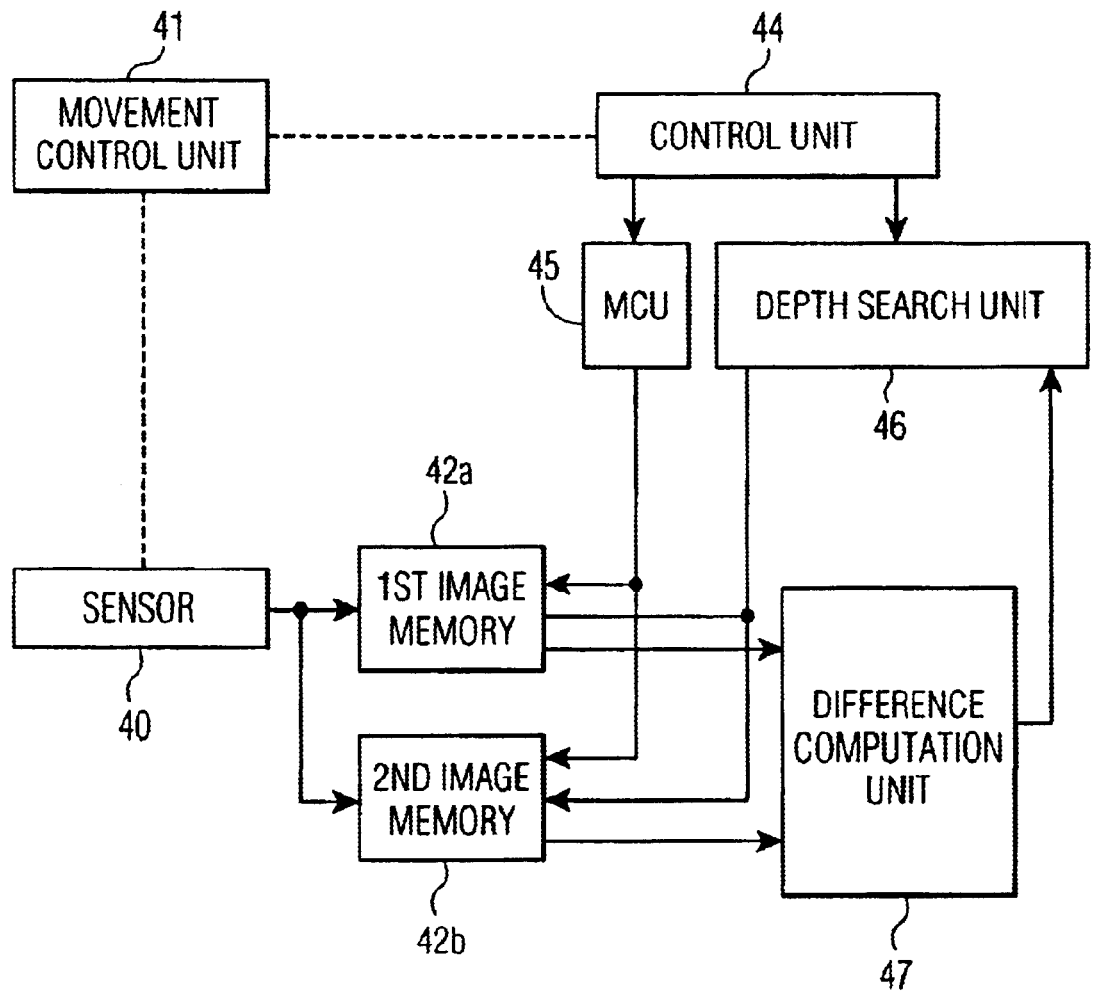
FIG. 4 shows an apparatus for estimating a depth between the viewpoint and a surface patch.

FIG. 4 shows an apparatus for estimating the depth. The apparatus contains a camera optics and sensor.40 coupled to a first and second image memory unit 42*a,b*. A control unit 44 is coupled to a memory control unit 45 and a depth search unit 46. Optionally a movement measuring and/or controlling unit 41 is coupled between the control unit 44 and the camera optics and sensor 40. The memory control unit 45 is coupled to the first and second image memory unit 42*a,b*. The depth search unit 46 has address outputs coupled to the image memory units 42*a,b*. The image memory units 42*a,b* have image data outputs coupled to a difference computation unit 47.

In operation the control unit 44 first causes memory control unit 45 to store a first and second images obtained from camera optics and sensor 40 to be stored in image memory unit 42*a,b* respectively. Subsequently, control unit 44 causes depth search unit 46 to search for matching regions in the images stored in the first and second image memory unit 42*a,b*. Control unit 44 may also supply movement parameters to the depth search unit 46, the movement parameters having been determined from observed or controlled camera optics and sensor 40 motion. However, this is not necessary. In the latter case, the estimated depth will be determined up to an arbitrary factor common for all location in the images.

Depth search unit 46 selects regions and candidate depth-orientation pairs. For a given region and candidate depth-orientation pair the depth search unit issues addresses of pixels at corresponding positions on the first and second image to the first and second memory unit 42*a,b* respectively. The image content at these positions is supplied to difference computation unit 47. The resulting measure of difference for a region is supplied to the depth search unit 46. The resulting measure of difference is loaded into depth search unit. This is repeated for a number of candidate depth-orientation pairs and regions. For each region the depth search unit 46 selects a depth-orientation pair that gives rise to a minimal measure of difference.

The method and device may be used for obtaining depth and orientation of surface patches. Such information may be obtained for all or most surface patches visible in an image. This information can be used for example for reconstructing images of a scene from various viewpoints. Once the scene is described in terms of patches with known texture, position and orientation conventional computer graphics techniques may be used to render image of the scene from various viewpoints.

Other applications of orientation and depth information include image compression. In compression techniques like MPEG video information is compressed by coding blocks of pixels in an image in terms of a movement with respect to another image. This assigns the same movement to each pixel in the block. Further changes of the pixels in the block are coded by including additional information for individual pixels. In MPEG blocks are not made too large, amongst others because this would drastically increase the need for such additional information, and therefore it would decrease the compression ratio.

By coding depth and orientation information for a block (on its own or in addition to other information like a motion vector), different movements may be assigned to different pixels, so that a closer match can be obtained between the pixels in the block obtained by this movement and the actual pixels. With such a coding less additional information is needed to code the image and larger blocks may be used, compressing the image even further. The use of depth and orientation for this purpose has the additional advantage that it ensures consistency of those aspects of the image for which human perception is most sensitive.

It should be noted that for image reconstruction and coding it is no problem that depth and orientation information obtained for homogeneous image area is less accurate. Because of the homogeneity this has little or no effect on the reconstruction or compression accuracy.

What is claimed is:

1. A method of optically determining, for a plane containing different camera viewpoints on respective optical axes perpendicular to the plane, respective distances between the plane and points on or near a surface patch that does not lie in a plane perpendicular to the optical axes of the camera and is visible in first and second images point projected from said viewpoints, the method comprising the steps of a) obtaining said first and second images containing the surface patch that does not lie in a plane perpendicular to the optical axes of the camera viewed from the different viewpoints, b) estimating distances of said points to said plane and orientations of small flat surfaces at each of said points without segmenting the surface patch into smaller patches;

c) applying to said first image an image-to-image mapping function based on the estimated distances and orientations to predict which pixel values of the first image correspond to pixel values of the second image;

d) determining differences between the predicted pixel values of the second image and actual corresponding pixel values of the second image;

e) aggregating the determined differences;

f) repeating steps b) through e) with new estimates unless said steps have already been repeated for a predetermined number of iterations; and g) determining, based on the lowest aggregate of determined differences from among iterations of steps b) through e), a best matching set of points, and correspondingly, orientations and distances to the plane.

2. A method according to claim 1, comprising the steps of taking a predetermined first region in the first image, taking a predetermined set of first points in the first region, for each of available combinations of depth and orientation;

computing second points in the second image corresponding to the first point and computing the aggregate of differences between the pixel values of the first and second image for the first and second points respectively, selecting the combination of depth and orientation that results in the minimum aggregate of differences.

3. A method according to claim 2, applied repeatedly, each repetition using for the first region a respective block from a grid of blocks covering the first image.

4. A method according to claim 1, wherein available combinations of depth and orientation values form a proper subset of all possible combinations of depth and orientation values, the available combinations being selected by including a combination found as best combination for a region of the first image adjacent to a region where the surface path is visible.

5. A method according to claim 2, wherein a prior combination of depth and orientation is estimated for the region from displacement of points viewing identical location of the surface patch the first image and a further image, and wherein the available combinations of depth and orientation values from a proper subset of all possible combinations of depth and orientation values, the available combinations being selected by including the prior combination.

6. A device for optically determining, for a plane containing different camera viewpoints on respective optical axes perpendicular to the plane, respective distances between the plane and points on or near a surface patch that does not lie in a plane perpendicular to the optical axes of the camera and is visible in first and second images point projected from said viewpoints, viewing depth, the device comprising:

an image capture circuit configured for a) obtaining said first and second images containing a surface patch that does not lie in a plane perpendicular to the optical axes of the camera as viewed from the different viewpoints; and a search unit configured for:

b) estimating distances of said points to said plane and orientations of small flat surfaces at each of said points without segmenting the surface patch into smaller patches;

c) applying to said first image an image-to-image mapping function based on the estimated distances and orientations to predict which pixel values of the first image correspond to pixel values of the second image;

d) determining differences between the predicted pixel values of the second image and actual corresponding pixel values of the second image;

e) aggregating the determined differences;

f) repeating steps b) through e) with new estimates unless said steps have already been repeated for a predetermined number of iterations; and g) determining, based on the lowest aggregate of determined differences from among iterations of steps b) through e), a best matching set of points, and correspondingly, orientations and distances to the plane.

7. A device according to claim 6, comprising the search unit being arranged to take a predetermined first region in the first image, take a predetermined set of first points in the first region, for each of available combinations of depth and orientation:

compute second points in the second image corresponding to the first points and compute the aggregate of differences between the pixel values of the first and second image for the first and second points respectively, select the combination of depth and orientation that results in the minimum aggregate of differences.

8. A device according to claim 6, the search unit taking as the first region respective block from a grid of blocks covering the first image.

9. A device according to claim 6, wherein available combinations of depth and orientation values form a proper subset of all possible combinations of depth and orientation values, the search unit selecting the available combinations by including a combination found as best combination for a region of the first image adjacent to a region where the surface patch is visible.

10. A device according to claim 6, wherein a prior combination of depth and orientation is estimated for the region from displacement of points viewing identical location of the surface patch the first image and further image, and wherein the available combinations of depth and orientation values form a proper subset of all possible combinations of depth and orientation values, the available combinations being selected by including the prior combination.

* * * * *